US 6,236,314 B1

(12) United States Patent  
Smith et al.

(10) Patent No.: US 6,236,314 B1  
(45) Date of Patent: May 22, 2001

(54) TRANSPONDER MODULES, RF TAGGING SYSTEM, METHOD OF OPERATING A TRANSPONDER MODULE AND METHODS OF TAGGING AN OBJECT HAVING A CONDUCTIVE SURFACE

(75) Inventors: Freddie W. Smith; Dirgha Khatri, both of Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/388,560

(22) Filed: Sep. 2, 1999

(51) Int. Cl.$^7$ .................................................. G08B 13/14
(52) U.S. Cl. ...................... 340/572.7; 340/505; 342/51; 343/850
(58) Field of Search ........................ 340/572.7, 572.1, 340/505, 10.1; 343/700 MS, 878, 850, 857; 342/51

(56) References Cited

U.S. PATENT DOCUMENTS

| 4,075,632 | | 2/1978 | Baldwin et al. ........................ 342/51 |
| 4,575,725 | * | 3/1986 | Tressett ........................ 343/700 MS |
| 4,926,182 | | 5/1990 | Ohta et al. .............................. 342/44 |
| 5,278,573 | * | 1/1994 | Siikarla ................................ 343/749 |
| 5,392,049 | * | 2/1995 | Gunnarsson ........................ 342/51 X |
| 5,552,790 | * | 9/1996 | Gunnarsson ............................ 342/51 |
| 5,608,391 | * | 3/1997 | Bantli et al. ........................ 342/51 X |
| 5,617,060 | | 4/1997 | Wilson et al. ........................ 330/129 |
| 5,621,412 | | 4/1997 | Sharpe et al. ........................... 342/51 |
| 5,649,296 | | 7/1997 | MacLellan et al. ................. 455/38.2 |
| 5,755,831 | | 5/1998 | Lane ..................................... 29/623.1 |
| 5,912,622 | * | 6/1999 | Endo et al. ......................... 340/572.5 |
| 5,939,984 | * | 8/1999 | Brady et al. ........................ 340/572.1 |
| 6,049,278 | * | 4/2000 | Guthrie et al. ..................... 340/572.1 |
| 6,113,658 | | 9/2000 | Lane ..................................... 29/623.1 |
| 6,133,836 | * | 10/2000 | Smith ................................ 340/572.7 |
| 6,137,422 | * | 10/2000 | Hahn et al. ................... 340/572.1 X |

* cited by examiner

Primary Examiner—Thomas Mullen  
(74) Attorney, Agent, or Firm—Wells, St. John, Roberts, Gregory & Matking PS

(57) ABSTRACT

A transponder module includes a circuit board having top and bottom surfaces and an inverted-F receive antenna formed on the circuit board. The receive antenna includes a ground plane formed on one of the surfaces and an active element formed above the ground plane. The module also includes a RF engine having an input coupled to the receive antenna, an output and a power supply input. The module additionally includes a RF decoupling network having first and second ports. The first port is coupled to the output of the RF engine. The module further includes an inverted-F backscatter antenna coupled to the second port of the RF decoupling network. The backscatter antenna includes a second ground plane formed on one of the surfaces and a second active element formed above the second ground plane. A method of tagging an object having a conductive surface includes coupling a transponder module including a low profile antenna to the conductive surface such that a ground plane contained in the transponder module is adjacent the conductive surface of the object and transmitting a signal from the low profile antenna to an interrogator, the signal including information relevant to the object.

28 Claims, 2 Drawing Sheets

TRANSPONDER MODULES, RF TAGGING SYSTEM, METHOD OF OPERATING A TRANSPONDER MODULE AND METHODS OF TAGGING AN OBJECT HAVING A CONDUCTIVE SURFACE

TECHNICAL FIELD

The present invention relates to transponder modules, a RF tagging system, a method of operating a transponder module and methods of tagging an object having a conductive surface.

BACKGROUND OF THE INVENTION

Electronic identification systems typically include two devices which are configured to communicate with one another. Preferred configurations of the electronic identification systems provide such communications via a wireless medium.

One such configuration is described in U.S. patent application Ser. No. 08/705,043, filed Aug. 29, 1996, assigned to the assignee of the present application, and incorporated herein by reference. This application discloses the use of a radio frequency (RF) communication system 10 including one or more radio frequency transponder modules 12, as described below with reference to FIG. 1. The transponder modules 12 are each coupled to an object (not illustrated) that the system 10 recognizes because of signals that the transponder modules 12 emit in response to stimuli. The system 10 includes an interrogator 13 operating in response to commands from a controller 14. Data and commands are exchanged between the interrogator 13 and the controller 14 through interconnections 15.

In one mode of operation, a transmitter TX 16 contained in the interrogator 13 supplies RF signals through interconnections 17 to a transmit/receive (T/R) antenna system 18. The T/R antenna system 18, in turn, radiates an interrogation signal 20 to one or more of the transponder modules 12. When the interrogation signal 20 is received by one of the transponder modules 12, a response signal 24 may be generated and transmitted. The response signal 24 typically includes modulation allowing some property or set of properties of the transponder module 12 to be determined. The property or properties describe the object (not illustrated) to which the transponder module 12 is coupled.

The response signal 24 is received by the T/R antenna system 18 and is coupled to a receiver RX 28. The receiver RX 28 demodulates the received response signal 24 and supplies information determined from the received response signal 24 to the controller 14 via the interconnections 15. The controller 14, in turn, may be able to supply information derived from the response signal 24 to an external processor (not illustrated) via a bus or other data link 30.

Systems such as the system 10 find wide-ranging application in a broad variety of settings. The IPASS toll collection system presently in use in the Chicago area is one example of such a system. In transponder-based toll collection systems, the presence of an object, such as a moving vehicle (not illustrated), is detected by a detector. In a toll collection system, the detection process may rely on reflection of electromagnetic waves, detection of magnetic anomalies or detection of a large mass.

In response to detection of the presence of the vehicle, the controller 14 causes the transmitter TX 16 to transmit interrogation signals 20 having carefully limited range. The transponder module 12 is typically a dash-mounted unit that has been pre-programmed to identify the vehicle and to provide information regarding a pre-existing account associated with that vehicle.

The transponder module 12 transmits the response signal 24 containing information to the interrogator 13. The information in the response signal 24 identifies the vehicle and the account associated with that transponder module 12. The receiver RX 28 receives the response signal 24, demodulates this information and couples the received information to the controller 14. The controller 14 may pass the received information to one or more computers (not shown) via the data link 30, causing the account associated with the vehicle to be appropriately decremented. As a result, the vehicle need not slow for the toll collection process, providing smoother traffic flow, reducing fuel consumption and generally facilitating both vehicular transportation and toll collection.

Similarly, an automated fuel retail system (not illustrated) may use the system 10 including the interrogator 13. The interrogator 13 exchanges signals with the transponder 12 that is attached to vehicle (not illustrated) to determine whom to bill for fuel dispensed to that vehicle when the vehicle is fueled at the fuel dispensing station.

In these kinds of systems 10, a range of the interrogation signal 20 is carefully limited to avoid interrogation of more than one transponder module 12 at a time. Additionally, it is often desirable to limit the amount of power that is required by the transponder module 12 in order to provide a stand-alone transponder module 12 that is able to operate without requiring an external source of power and that has long battery life.

Further, it is generally desirable to provide systems 10 that are as simple as possible. One approach to realizing these goals is to receive and transmit the interrogation 20 and response 24 signals in a common frequency band. In some systems, the response signals 24 are derived from the interrogation signals 20 and the transponder module 12 may even be one that simply modulates and re-transmits the received interrogation signal 20 to provide the response signal 24.

One simple technique for modulating the interrogation signal 20 to form the response signal 24 is to either (i) forward bias a diode that is coupled between ground and an antenna in the transponder module 12 to couple the antenna to ground, corresponding to a first logical state, or (ii) to leave the diode unbiased or reverse biased, decoupling the antenna from ground and corresponding to a second logical state. The antenna re-transmits the interrogation signal 20 in the second logical state but not in the first logical state. The transponder module 12 repeatedly switches between these two logical states according to predetermined patterns while the interrogation signal 20 is present to modulate the response signal 24 with a binary signal. These kinds of systems 10 are known as backscatter systems.

In some backscatter systems, the interrogation signal 20 includes a modulated preamble that carries data identifying which transponder module 12 in a population of such transponder modules 12 is targeted to respond. The preamble of the interrogation signal 20 further may include a request for specific data from the targeted transponder module 12. In such backscatter systems, the interrogation 20 and reply 24 signals must necessarily use the same frequency band and both the interrogation 20 and response 24 signals are present at the same time.

Backscatter RFID systems 10 are presently of great interest for identifying, sorting, counting and routing in situations where selected objects in a population of objects require individual recognition and treatment. Examples include luggage-handling and routing systems associated with public or private transportation systems, package handling and routing systems, vehicle or other rental or checkout systems and inventory control systems.

Some kinds of systems 10 may interrogate a large number of transponder modules 12 simultaneously. For example, an inventory control system may be used to determine if a specific item coupled to the target transponder module 12 is contained in a warehouse. Typically, each transponder module 12 is associated with an inventory item in the warehouse and vice versa. Various protocols have been developed to facilitate identification of, and communication with, a specific transponder module 12 in a population of similar transponder modules 12.

In many of these systems 10, there is need for low cost, compact and rugged transponder modules 12 that are secured to objects, such as vehicles, having metallic, and therefore conductive, surfaces. It is also desirable that the transponder modules 12 provide a compact package that does not protrude from the object bearing the transponder module 12. However, most antennas operate by developing electrical fields between one portion of the antenna and another portion of the antenna. When an antenna is mounted flush against a conductive surface, the potential differences that are required for successful operation of the antenna are effectively neutralized by image charges developed in the conductive surfaces of the object being tagged by the transponder module 12.

What is needed is an antenna structure that can be incorporated into a compact transponder module without compromising the form factor of the transponder module and that can operate effectively even when the transponder module is mounted on a conductive surface of the object bearing the transponder module.

SUMMARY OF THE INVENTION

In one aspect, the present invention provides a method of operating a transponder module. The method includes receiving an interrogation signal by an inverted-F antenna contained within the transponder module and transmitting a modulated backscattered response signal from a backscatter inverted-F antenna contained within the transponder module in response to the received interrogation signal.

In another aspect, the present invention includes a transponder module. The transponder module includes a circuit board having top and bottom surfaces and a low profile receive antenna formed on the circuit board. The receive antenna includes a ground plane formed on one of the surfaces and an active element formed on another of the surfaces above the ground plane. The transponder module also includes a RF engine having an input coupled to the receive antenna, an output and a power supply input, and a RF decoupling network having first and second ports. The first port is coupled to the output of the RF engine. The transponder module further includes a low profile backscatter antenna coupled to the second port of the RF decoupling network. The backscatter antenna includes a second ground plane formed on one of the surfaces and a second active element formed above the second ground plane.

In another aspect, the present invention includes a transponder module. The transponder module includes a circuit board having top and bottom surfaces and an inverted-F receive antenna formed on the circuit board. The receive antenna includes a ground plane formed on one of the surfaces and an active element formed on another of the surfaces above the ground plane. The transponder module also includes a RF engine having an input coupled to the receive antenna, an output and a power supply input, and a RF decoupling network having first and second ports. The first port is coupled to the output of the RF engine. The transponder module further includes an inverted-F backscatter antenna coupled to the second port of the RF decoupling network. The backscatter antenna includes a second ground plane formed on one of the surfaces and a second active element formed above the second ground plane.

In a further aspect, the present invention includes a RF tagging system. The RF tagging system includes an interrogation unit for transmitting interrogation signals and receiving backscattered signals in response to the interrogation signals and a transponder module. The transponder module includes a circuit board having top and bottom surfaces, a low profile receive antenna formed on the circuit board above a first ground plane, a RF engine having an input coupled to the receive antenna, an output and a power supply input. The RF tagging system also includes a RF decoupling network having first and second ports. The first port is coupled to the output of the RF engine. The RF tagging system also further includes a low profile backscatter antenna formed on the circuit board above a second ground plane that is electrically decoupled from the first ground plane. The backscatter antenna is coupled to the second port of the RF decoupling network.

In yet another aspect, the present invention includes a method of tagging an object having a conductive surface. The method includes coupling a transponder module including a low profile antenna to the conductive surface such that a ground plane contained in the transponder module is adjacent the conductive surface of the object. The method also includes transmitting a signal including information relevant to the object from the low profile antenna to an interrogator.

In a still further aspect, the present invention includes a method of tagging an object having a conductive surface. The method includes coupling a transponder module to the conductive surface such that a ground plane contained in the transponder module is adjacent the conductive surface of the object, receiving an interrogation signal in a low profile receive antenna contained in the module and transmitting a backscatter signal from a low profile antenna backscatter antenna to an interrogator in response to the interrogation signal, the backscatter signal including information relevant to the object.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. patent Laws "to promote the Progress of Science and useful Arts" (Article 1, Section 8).

Figure 1:
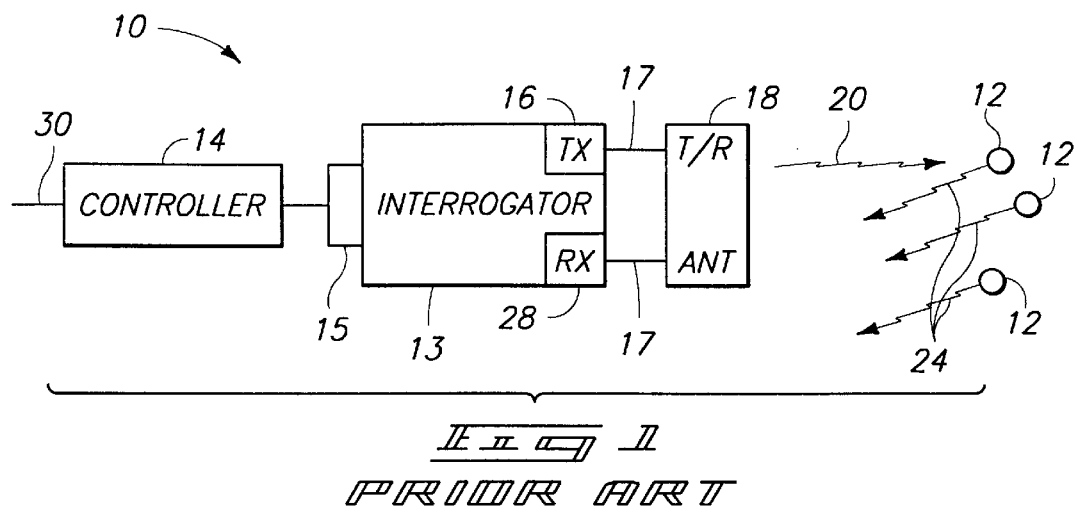
FIG. 1 is a simplified block diagram of a system for interrogating one or more radio frequency transponder modules, in accordance with the prior art.
Figure 2:
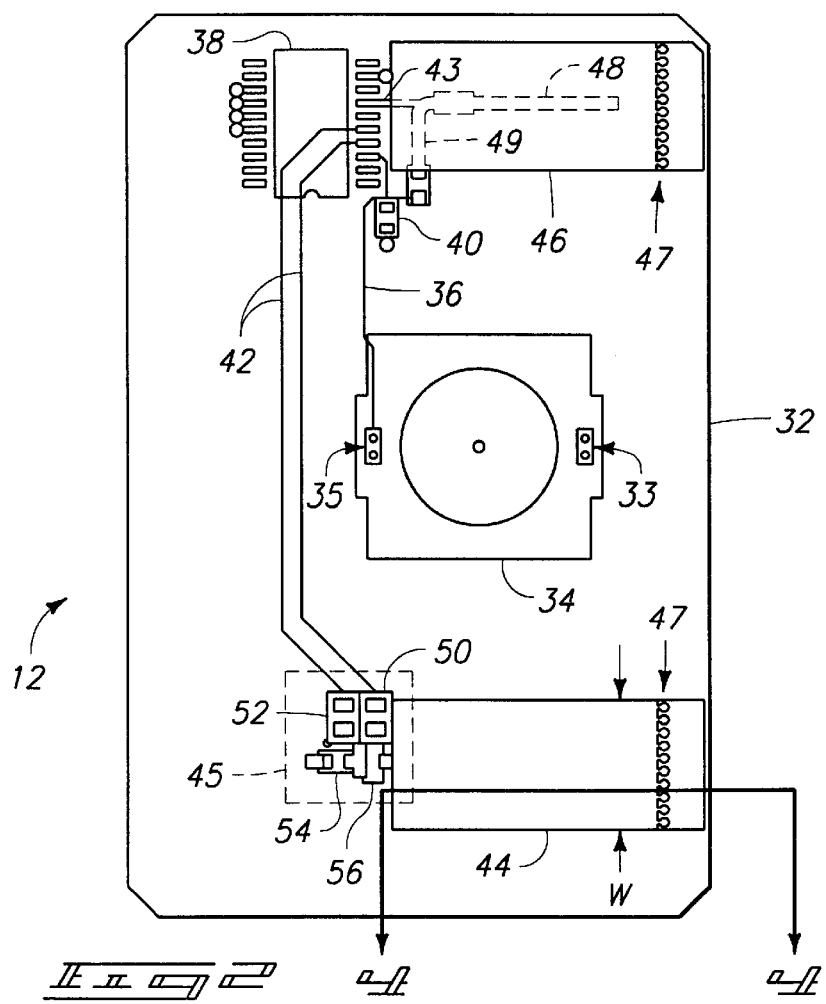
FIG. 2 is a simplified plan view of a transponder module for use in the RFID system of FIG. 1, in accordance with an embodiment of the present invention.

FIG. 2 is a simplified plan view of a transponder module 12 for use in the RFID system 10 of FIG. 1, in accordance with an embodiment of the present invention. The transponder module 12 includes a circuit board 32. In one embodiment, the circuit board 32 is formed from copper-clad FR-4 circuit board material. In one embodiment, a first terminal 33 couples a button-type battery 34 to a ground plane 60 (FIG. 4, infra) and a second terminal 35 couples power from the battery 34 to the transponder module 12. In one embodiment, the battery 34 is mounted on the circuit board 32. In one embodiment, the battery 34 is a button-type battery, as is described in more detail in U.S. patent application Ser. No. 09/047,761, now U.S. Pat. No. 6,113,658, which is a continuation of U.S. patent application Ser. No. 08/394,543, filed on Feb. 22, 1995, now U.S. Pat. No. 5,755,831, which are both assigned to the assignee of the present invention.

The circuit board 32 also includes a power supply bus 36, a RF engine 38, a power supply bus capacitor 40, conductors 42 and 43, a backscatter antenna 44, a RF decoupling network 45 and a receive antenna 46. In one embodiment, the backscatter antenna 44 and the receive antenna 46 each include multiple through plated holes 47. The conductors 42 couple the RF engine 38 to the backscatter antenna 44 through the RF decoupling network 45 and the conductor 43 couples the RF engine 38 to the receive antenna 46. The RF decoupling network 45 prevents RF energy from being coupled between the backscatter antenna 44 and the RF engine 38.

In one embodiment, the receive antenna 46 is tuned using a conventional single stub matching network that includes a feed line 48 having a first length and a matching stub 49 having a second length. Selection of the first and second lengths is conventional and reduces mismatch loss of the receive antenna 46. In one embodiment, a distal end of the matching stub 49 is coupled to RF ground through one or more capacitors and the feed line 48 may also include a capacitor for blocking dc current.

In one embodiment, the decoupling network 45 includes a pair of inductors 50 and 52, a capacitor 54 and a PIN diode 56. The PIN diode 56 has one lead (e.g, anode) coupled to a common node that is also coupled to one lead of the capacitor 54. Another lead (e.g., cathode) of the PIN diode 56 is coupled to the backscatter antenna 44. Another lead of the capacitor 54 is coupled to ground. The inductor 50 has one lead coupled to the RF engine 38 through one of the conductors 42 and another lead coupled to the backscatter antenna 44. The inductor 52 has one lead coupled to the RF engine 38 through another of the conductors 42 and another lead coupled to the common node.

The RF engine 38 switches current via the conductors 42 and the inductors 50 and 52 through the PIN diode 56 to modulate the impedance of the PIN diode 56 by turning it ON or OFF. When current passes through the PIN diode 56 to turn the PIN diode 56 ON, the impedance of the PIN diode 56 is low and the backscatter antenna 44 is effectively grounded through a combination of the capacitor 54 and the PIN diode 56. As a result, the backscatter antenna 44 does not re-radiate much energy from the interrogation signals 20 of FIG. 1 when the PIN diode 56 is biased ON.

When the PIN diode 56 is biased OFF, the impedance of the PIN diode 56 is high, the backscatter antenna 44 is decoupled from ground and the backscatter antenna 44 re-radiates RF energy from the interrogation signals 20 of FIG. 1. At the same time, the conductors 42 and the RF engine 38 are isolated from the RF energy in the backscatter antenna 44 by the inductors 50 and 52 and the capacitor 54. By switching the PIN diode 56 ON and OFF according to a predetermined pattern, a coded RF signal 24 is sent back to the interrogator 13 of FIG. 1.

In one embodiment, the exemplary RF engine 38 includes a small outline integrated circuit available as radio frequency identification device circuitry from Micron Communications Inc., 3176 South Denver Way, Boise, Id. 83705 under the trademark MicroStamp (TM) Engine and having designations MSEM256X10SG, MT59RC256R1FG.

Figure 3:
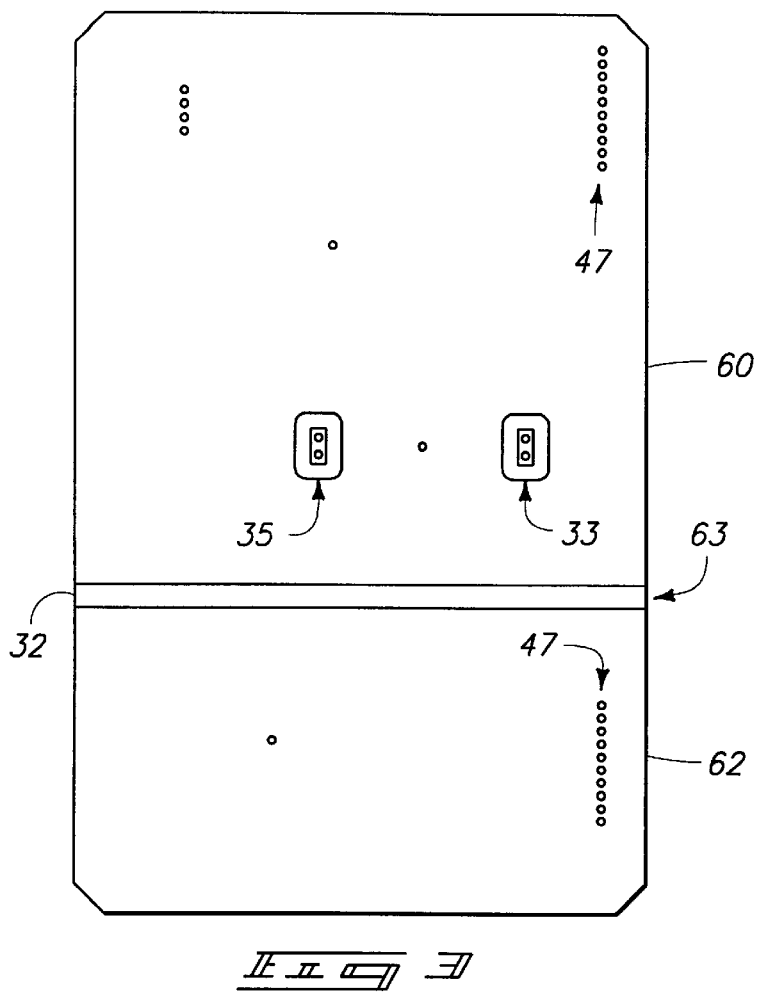
FIG. 3 is a simplified plan view of ground planes for the transponder module of FIG. 2, in accordance with an embodiment of the present invention.

FIG. 3 is a simplified plan view of ground planes 60 and 62 for the transponder module 12 of FIG. 2, in accordance with an embodiment of the present invention. In one embodiment, the ground planes 60 and 62 are formed from metal cladding on a surface of the circuit board 32 of FIG. 2 using conventional processing techniques. The ground planes 60 and 62 shield the receive antenna 46 and the backscatter antenna 44 from electrical influences that objects to which the ground planes 60 and 62 may be coupled could otherwise have on the receive antenna 46 and the backscatter antenna 44.

For example, operating characteristics of conventional antennas used with RF transponder modules 12 are adversely affected by being mounted on high dielectric constant surfaces or conductive surfaces. In contrast, RF transponder modules 12 employing antennas with integral ground planes 60 and 62 are not affected by being mounted on such surfaces when the antennas are formed on the surface of the integral ground plane 60 or 62 that is remote from the surface on which the transponder module 12 is mounted.

In one embodiment, the ground planes 60 and 62 are decoupled from each other by a gap 63. The gap 63 also electrically decouples the conductors 42 formed on one side of the circuit board 32 from the ground plane 62 formed on the other side of the circuit board 32. As a result, the RF engine 38 is decoupled from RF energy coupled into the backscatter antenna 44 from the interrogation signal 20 (FIG. 1).

Figure 4:
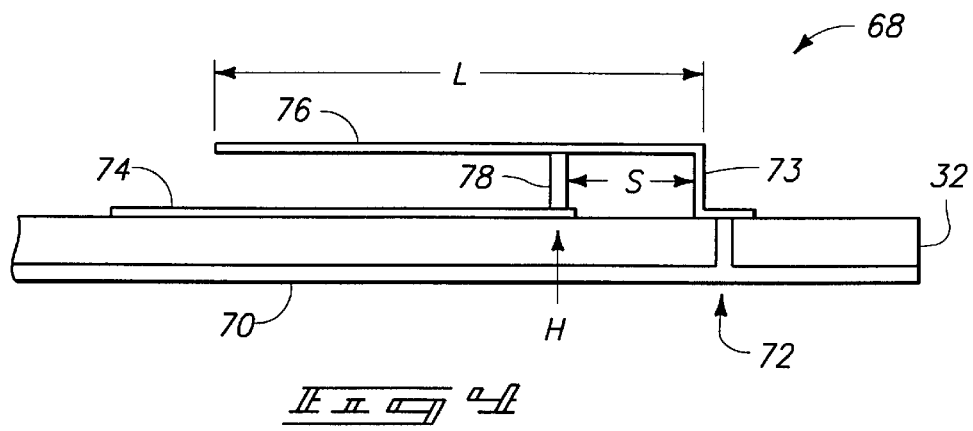
FIG. 4 is a simplified cross-sectional side view, taken along section lines 4—4 of FIG. 2, of an inverted-F antenna, in accordance with an embodiment of the present invention.

FIG. 4 is a simplified cross-sectional side view, taken along section lines 4—4 of FIG. 2, of an inverted-F antenna 68, in accordance with an embodiment of the present invention. The inverted-F antenna 68 may be used for the backscatter antenna 44 and the receive antenna 46 in the transponder module 12 of FIG. 2.

In one embodiment, the inverted-F antenna 68 includes a ground plane 70 formed on one surface of the circuit board 32, through-plated grounding holes 72, an upright element 73, a feed microstrip 74, an active element 76 and a feedpoint 78. The ground plane 70 corresponds to either of the ground planes 60 and 62 of FIG. 3. The active element 76 has one side grounded using through-plated holes 72 that couple the ground plane 70 to the upright element 73 and thus to one edge of the active element 76. In the embodiment shown in FIGS. 2 and 3, the ground planes 60 and 62 are formed on one side of the circuit board 32 that is intended to abut a surface of the object being tagged, while the active elements 76 of the backscatter 44 and receive 46 antennas are formed on an opposed side of the circuit board 32. Each of the backscatter 44 and receive 46 antennas employs 10 through plated holes 47 in order to provide low resistance ground connections between the active elements 76 and the ground planes 70.

The upright element 73 has a height H that is typically a small fraction of a wavelength (e.g., ca. 5%) and is coupled to the active element 76 along one side of the active element 76. The inverted-F antenna 68 thus presents a low profile, resulting in a compact transponder module 12. The feedpoint 78 is displaced from the upright element 73 by a distance S. Adjustment of the location of the feedpoint 78 relative to the upright element 73 and the active element 76 allows the inverted-F antenna 68 to be tuned or partially tuned. The active element 76 has a length L and a width W (see FIG. 2) extending into and out of the plane of FIG. 4. Adjustment of the width W affects the bandwidth of the inverted-F antenna 68, with bandwidth increasing as the width W is increased beyond the width of a wire.

In one embodiment designed to be operated at a frequency of 2.45 gigahertz, the separation S is 7 mm, the width W is 12.5 mm, the length L is 25.3 mm and the height H is 3.93 mm. In one embodiment, the length L is reduced to about 22 mm for the backscatter antenna 44 to optimize the impedance of the backscatter antenna 44.

Advantages of the inverted-F antenna 68 include broader bandwidth than some related antenna structures (e.g., inverted-L), compact form factor, low profile, tunability achieved through placement of the feedpoint, mixed horizontal and vertical polarization (i.e., ability to receive signals independent of antenna orientation) and the ability to operate even when one side of the inverted F antenna 68 (i.e., the ground plane 70) is mounted on a conductive surface. An additional advantage is that the space between the active element 76 and the ground plane 70 is primarily filled with a low loss tangent dielectric, viz., air, resulting in a low loss antenna structure 68.

Typically, the transponder modules 12 of FIGS. 1 and 2 are detachably coupled to the object being tagged (not illustrated), for example by a screw (not illustrated) that passes through a portion of the transponder module 12. An advantage that the transponder modules 12 employing the ground planes 60 and 62 of FIG. 3 provide is that the transponder modules 12 may be secured to ferrous objects via magnets extending over all or a portion of the area of the ground planes 60 and 62.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A transponder module comprising:
   a circuit board having first and second surfaces;
   a ground plane formed on the first surface;
   a low profile receive antenna formed on the circuit board over the ground plane;
   a RF engine having an input coupled to the receive antenna, an output and a power supply input;
   a RF decoupling network having first and second ports, the first port coupled to the output of the RF engine;
   a second ground plane formed on the first surface; and
   a low profile backscatter antenna coupled to the second port of the RF decoupling network, the backscatter antenna formed over the second ground plane.

2. The module of claim 1, further comprising a button-type battery having a first electrode coupled to the ground plane and a second electrode coupled to the power supply input to the RF engine.

3. The module of claim 1, wherein the RF engine comprises a small outline integrated circuit.

4. The module of claim 1, wherein the ground plane and the second ground plane are separated and isolated from each other by a gap, and the RF decoupling network is spaced apart from the second ground plane adjacent the gap.

5. The module of claim 1, wherein:
   the low profile receive antenna comprises an inverted-F receive antenna; and
   the low profile backscatter antenna comprises an inverted-F backscatter antenna.

6. The module of claim 1, wherein the RF decoupling network comprises:
   a PIN diode having first and second terminals;
   a first coil having first and second terminals, the first terminal coupled to the RF engine, the second terminal coupled to the first terminal of the PIN diode and to the backscatter antenna;
   a second coil having first and second terminals, the first terminal coupled to the RF engine, the second terminal coupled to the second terminal of the PIN diode; and
   a capacitor having a first terminal coupled to the second terminal of the PIN diode and a second terminal coupled to the second ground plane.

7. The module of claim 1, wherein the receive antenna includes an active element that is one-fourth of a wavelength in length.

8. The module of claim 1, wherein the backscatter antenna includes an active element that is less than one-fourth of a wavelength in length.

9. A transponder module comprising:
   a circuit board having top and bottom surfaces;
   an inverted-F receive antenna formed on the circuit board, the receive antenna including a ground plane formed on one of the surfaces and an active element formed on another of the surfaces above the ground plane;
   a RF engine having an input coupled to the receive antenna, an output and a power supply input;
   a RF decoupling network having first and second ports, the first port coupled to the output of the RF engine; and
   an inverted-F backscatter antenna coupled to the second port of the RF decoupling network, the backscatter antenna including a second ground plane formed on one of the surfaces and a second active element formed above the second ground plane.

10. The module of claim 9, further comprising a button-type battery having a first electrode coupled to the ground plane and a second electrode coupled to the power supply input to the RF engine.

11. The module of claim 9, wherein the RF engine comprises a small outline integrated circuit.

12. The module of claim 9, wherein the ground plane and the second ground plane are separated and isolated from each other by a gap, and the RF decoupling network is placed entirely above the second ground plane adjacent the gap.

13. The module of claim 9, wherein the ground plane and the second ground plane are electrically isolated from each other.

14. The module of claim 9, wherein the RF decoupling network comprises:
   a PIN diode having first and second terminals;
   a first coil having first and second terminals, the first terminal coupled to the RF engine, the second terminal coupled to the first terminal of the PIN diode and to the second active element of the backscatter antenna;

a second coil having first and second terminals, the first terminal coupled to the RF engine, the second terminal coupled to the second terminal of the PIN diode; and a capacitor having a first terminal coupled to the second terminal of the PIN diode and a second terminal coupled to the second ground plane.

15. The module of claim 9, wherein the receive antenna active element is one-fourth of a wavelength in length.

16. The module of claim 9, wherein the backscatter antenna active element is less than one-fourth of a wavelength in length.

17. A RF tagging system comprising:

an interrogation unit for transmitting interrogation signals and receiving backscattered signals in response to the interrogation signals; and a transponder module including:
   a circuit board having top and bottom surfaces;
   a first ground plane formed on one of the surfaces;
   a low profile receive antenna formed on the circuit board above the first ground plane;
   a RF engine having an input coupled to the receive antenna, an output and a power supply input;
   a RF decoupling network having first and second ports, the first port coupled to the output of the RF engine;
   a second ground plane formed on one of the surfaces; and
   a low profile backscatter antenna formed on the circuit board above the second ground plane, the backscatter antenna coupled to the second port of the RF decoupling network.

18. The tagging system of claim 17, wherein the receive antenna includes an active element formed above the first ground plane.

19. The tagging system of claim 17, wherein the backscatter antenna includes an active element formed above the second ground plane.

20. The tagging system of claim 17, wherein the receive antenna includes a first active element formed above the first ground plane, and the backscatter antenna includes a second active element formed above the second ground plane.

21. The tagging system of claim 20, wherein the RF decoupling network comprises:

a PIN diode having first and second terminals;

a first coil having first and second terminals, the first terminal coupled to the RF engine, the second terminal coupled to the first terminal of the PIN diode and to the second active element of the backscatter antenna;

a second coil having first and second terminals, the first terminal coupled to the RF engine, the second terminal coupled to the second terminal of the PIN diode; and a capacitor having a first terminal coupled to the second terminal of the PIN diode and a second terminal coupled to the second ground plane.

22. The tagging system of claim 20, wherein the first ground plane and the second ground plane are separated and isolated from each other by a gap, and the RF decoupling network is placed entirely above the second ground plane adjacent the gap.

23. The tagging system of claim 17, wherein the low profile receive and backscatter antennas each have a height above the circuit board of about five percent of the wavelength of the antennas.

24. The tagging system of claim 17 wherein the receive antenna and the backscatter antenna each comprise an inverted-F antenna.

25. A method of operating a transponder module comprising:

receiving an interrogation signal by an inverted-F antenna contained within the transponder module; and transmitting a modulated backscattered response signal from a backscatter inverted-F antenna contained within the transponder module in response to the received interrogation signal.

26. The method of claim 25 further comprising mounting the transponder module such that a ground plane contained in the transponder module is adjacent a conductive surface of an object corresponding to the transponder module.

27. The method of claim 25 further comprising transmitting data describing an object to which the transponder module is coupled.

28. The method of claim 25 further comprising mounting the transponder module such that a ground plane contained in the transponder module is adjacent a high dielectric constant surface of an object corresponding to the transponder module.

* * * * *